(12) United States Patent
Chang et al.

(10) Patent No.: US 9,917,342 B2
(45) Date of Patent: Mar. 13, 2018

(54) WAVEGUIDE HAVING A HOLLOW POLYMERIC LAYER COATED WITH A HIGHER DIELECTRIC CONSTANT MATERIAL

(71) Applicant: THE REGENTS OF THE UNIVERSITY OF CALIFORNIA, Oakland, CA (US)

(72) Inventors: Mau-Chung Frank Chang, Los Angeles, CA (US); Lan Nan, Los Angeles, CA (US); Yanghyo Kim, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 59 days.

(21) Appl. No.: 14/849,957

(22) Filed: Sep. 10, 2015

(65) Prior Publication Data
US 2016/0064795 A1 Mar. 3, 2016

Related U.S. Application Data

(63) Continuation of application No. PCT/US2014/023725, filed on Mar. 11, 2014.

(60) Provisional application No. 61/776,576, filed on Mar. 11, 2013.

(51) Int. Cl.
| | |
|---|---|
| *H01P 3/16* | (2006.01) |
| *G02B 6/032* | (2006.01) |
| *H01P 3/12* | (2006.01) |
| *H01Q 21/00* | (2006.01) |

(52) U.S. Cl.
CPC ............... *H01P 3/16* (2013.01); *G02B 6/032* (2013.01); *H01P 3/12* (2013.01); *H01Q 21/00* (2013.01); *G02B 2006/0325* (2013.01)

(58) Field of Classification Search
CPC .... H01P 3/15; H01P 3/20; H01P 3/121; H01P 3/122; H01P 3/16
USPC .......................... 333/239, 241, 242
See application file for complete search history.

(56) References Cited

U.S. PATENT DOCUMENTS

| | | | | |
|---|---|---|---|---|
| 4,441,091 A | * | 4/1984 | Nishida et al. | ........ H01Q 13/20 333/236 |
| 2005/0047741 A1 | | 3/2005 | Sfez | |
| 2007/0165991 A1 | | 7/2007 | Huber | |
| 2008/0036558 A1 | | 2/2008 | Suarez-Gartner et al. | |

(Continued)

FOREIGN PATENT DOCUMENTS

JP   2004-245894 A   9/2004

OTHER PUBLICATIONS

Korea Intellectual Property Office (KIPO), International Search Report and Written Opinion, PCT/US2014/023725, dated May 28, 2014, pp. 1-13, with claims searched, pp. 14-17. This application is a continuation of the foregoing PCT international application.

*Primary Examiner* — Benny Lee
(74) *Attorney, Agent, or Firm* — O'Banion & Ritchey LLP; John P. O'Banion

(57) ABSTRACT

A wave cable transceiver system is disclosed incorporating an air-core or noble gas filled hollow plastic waveguide. The system may include a transmitter receiver, in-antennas and a tubular plastic waveguide with the inner air-core. The hollow plastic waveguide is a low loss and low dispersion guiding channel for the electromagnetic radiation.

22 Claims, 5 Drawing Sheets

(56) References Cited

U.S. PATENT DOCUMENTS

2010/0135626 A1  6/2010 Sun et al.

* cited by examiner

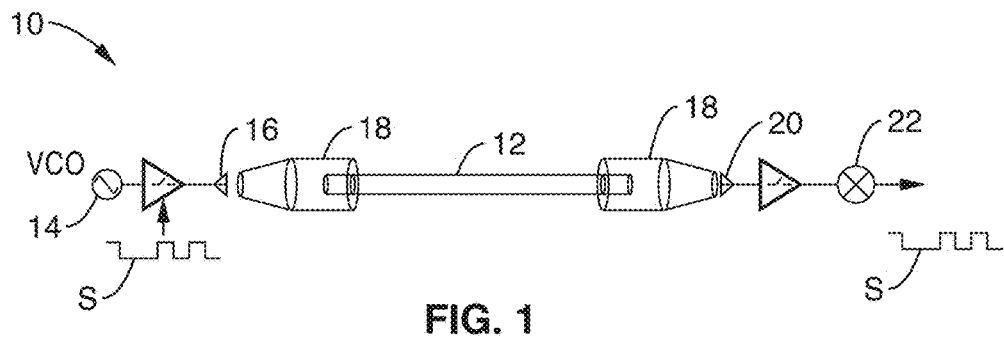
FIG. 1
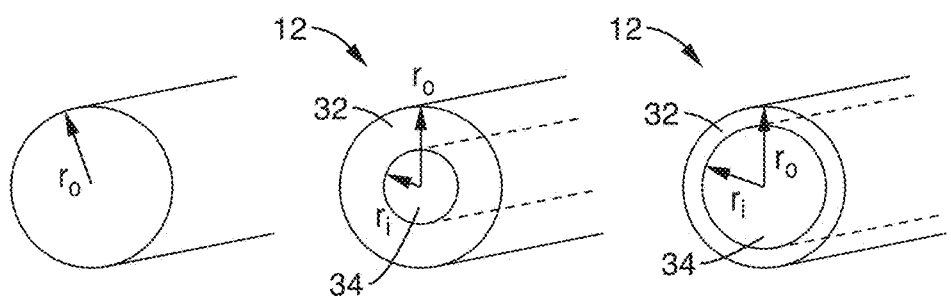
FIG. 2A  FIG. 2B  FIG. 2C
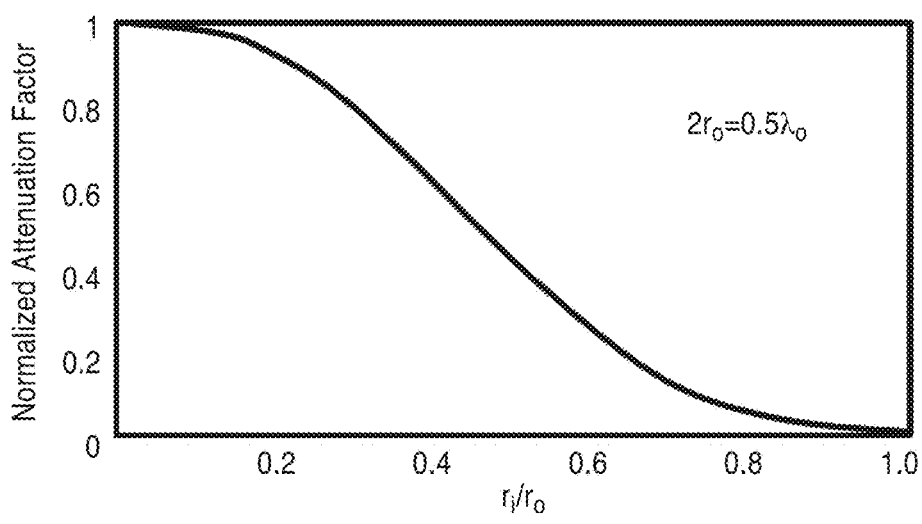
FIG. 3

WAVEGUIDE HAVING A HOLLOW POLYMERIC LAYER COATED WITH A HIGHER DIELECTRIC CONSTANT MATERIAL

CROSS-REFERENCE TO RELATED APPLICATIONS

This application is a 35 U.S.C. § 111(a) continuation of PCT international application number PCT/US2014/023725 filed on Mar. 11, 2014, incorporated herein by reference in its entirety, which claims priority to, and the benefit of, U.S. provisional patent application Ser. No. 61/776,576 filed on Mar. 11, 2013, incorporated herein by reference in its entirety. Priority is claimed to each of the foregoing applications.

The above-referenced PCT international application was published as PCT International Publication No. WO 2014/159450 on Oct. 2, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to communication systems, and more particularly to systems and methods for interconnecting data center inter-server communications.

2. Description of Related Art

There are generally two types of links commercially available for data center communications: fiber optics and copper based active cable. However, fiber optic and active cable transceivers dissipate powers on the order of a few milli-watts.

A recent work presented the feasibility of using a solid rectangular plastic waveguide for high speed (26 Gbps) data link over 0.12 m at 57 GHz and 80 GHz, of which the distance was limited by the dielectric loss and dispersion characteristics of the solid rectangular plastic medium.

SUMMARY OF THE INVENTION

An aspect of the present invention is an energy-efficient and longer distance data link at millimeter wave frequency, using a circular and hollow plastic cable, i.e. "wave cable," for mid-range (1-100 m) inter-server/container communications.

Another aspect is a hollow plastic wave cable used as a medium for data center communications. The hollow plastic waveguide is a low loss and low dispersion guiding channel for the electromagnetic radiation. The waveguide incorporates polymeric materials such as Teflon (i.e. polytetrafluoroethylene) or polyethylene, which are inexpensive and easy to access commercially. Millimeter wave transceiver designs may be simplified based on channel loss and power budget to enhance energy efficiency by 10-100 times more than existing technologies.

Another aspect is a high speed and energy-efficient interconnect comprising a hollow plastic waveguide ("wave cable") and an RF transceiver with front-end antennas and couplers. The RF transceiver may be configured with a carrier frequency ranging from tens of GHz to sub THz. In one exemplary embodiment, a 60 GHz transceiver is used. The transceiver adopts an amplitude shift keying (ASK) modulation scheme. The hollow plastic waveguide is a low loss and low dispersion guiding channel for the electromagnetic radiation. With proper sizing, a single mode, i.e. HE11, propagates along the hollow plastic waveguide. The energy is concentrated in the hollow core, where the medium loss tangent is negligible. The hollow core may be filled with noble gas.

The complete link achieves an energy efficiency of 1.1 pJ/m with a 3.3 Gbps data rate at 7.6 m distance. This energy efficiency is 5 times better than the current standards using copper based active cables, and more than 40 times better than the prior art using solid rectangular plastic waveguide.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic diagram of a wave cable transceiver incorporating an air-core or noble gas filled hollow plastic waveguide in accordance with the present invention.

FIG. 2A illustrates a cross-section of a solid plastic waveguide.

FIG. 2B illustrates a cross-section of a hollow plastic waveguide with a hollow radius ratio $r_i/r_o=0.5$.

FIG. 2C illustrates a cross-section of a hollow plastic waveguide with a hollow radius ratio $r_i/r_o=0.8$.

FIG. 3 shows a plot of the attenuation factor as a function of hollow radius ratio $r_i/r_o$.

DETAILED DESCRIPTION OF THE INVENTION

Figure 4:
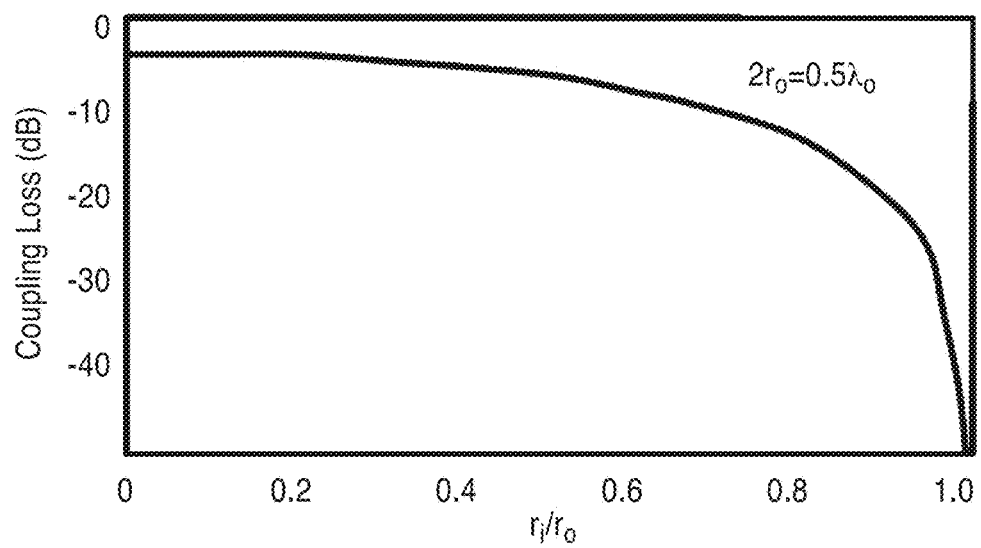
FIG. 4 shows a plot of the coupling loss as a function of hollow radius ratio $r_i/r_o$.

FIG. 1 shows a schematic diagram of a wave cable transceiver system 10 incorporating an air-core or noble gas filled hollow plastic waveguide 12 for transmitting a signal S in accordance with the present invention. In one exemplary implementation, the system 10 comprises a 60 GHz non-coherent amplitude shift keying (ASK) transmitter (Tx) 14 (e.g., voltage-controlled oscillator (VCO)), a receiver (Rx) 22, in-package folded-dipole antennas 16, 20, and a round hollow plastic waveguide 12 with the inner air-core. The hollow plastic waveguide 12 is a low loss and low dispersion guiding channel for the electromagnetic radiation. Couplers 18 may be disposed between the antennas 16, 20 and ends of the waveguide 12.

Wave cable transceiver system 10 has three major advantages: 1) higher energy efficiency with its Figure of Merit (FoM) defined as dividing the total transceiver power consumption by the maximum data rate under normalized communication distance (i.e. pJ/m); 2) higher system stability by removing mechanical connectors from electrical cable systems and eliminating optical-to-electrical (O2E) and multi-channel electrical-to-optical (E2O) converters from optical fiber systems; and 3) low system cost due to the use of commercially available hollow plastic cables made of highly accessible and inexpensive Teflon or polyethylene.

The transceiver/transmitter/receiver 14, 22 may comprise an RF transceiver configured with a carrier frequency ranging from tens of GHz to sub THz. In one exemplary embodiment, a 60 GHz transceiver is used. The transceiver 22 may use an amplitude shift keying (ASK) modulation scheme. With proper sizing, a single mode, e.g. HE11, propagates along the hollow plastic waveguide 12. The energy is concentrated in the hollow core 34 (see FIG. 5), where the medium loss tangent is negligible. The hollow core 34 may be filled with air or a noble gas.

FIG. 2A through 2C show the structures of solid circular plastic waveguide having an outer radius $r_o$ and hollow plastic waveguide having the outer radius $r_o$ and inner radius $r_i$ with varying hollow radius ratio $r_i/r_o$. FIG. 2A illustrates a cross-section of a solid plastic waveguide. FIG. 2B illustrates a cross-section of a hollow plastic waveguide 12 with an air-core 34 surrounded by a dielectric layer 32 and a hollow radius ratio $r_i/r_o=0.5$. FIG. 2C illustrates a cross-section of a hollow plastic waveguide 12 with an air-core 34 surrounded by a dielectric layer 32 and a hollow radius ratio $r_i/r_o=0.8$.

FIG. 3 shows a plot of the normalized attenuation factor as a function of hollow radius ratio $r_i/r_o$, which explains how the ratio between the inner radius $r_i$ and outer radius $r_o$, affects the loss performance. By keeping the outer diameter a half wavelength at the operating frequency (2 $r_o=0.5\lambda_o$), as the ratio increases, more energy propagates through the air-core, and consequently lowers the attenuation factor. For example, a solid circular Teflon waveguide 12 with a diameter of 3 mm has an attenuation factor of 3 dB/m at 60 GHz. With an inner hollow core radius ratio of 0.5, the attenuation factor is reduced to 1.5 dB/m.

FIG. 4 shows a plot of the coupling loss (in dB) as a function of hollow radius ratio $r_i/r_o$, also with the outer diameter a half wavelength at the operating frequency (2 $r_o=0.5\lambda_o$). The coupling loss is defined as the ratio between the surface power of the propagating mode and the total radiation power from the source (i.e., antenna) in dB. As shown in FIG. 4, the coupling loss increases with the hollow ratio $r_i/r_o$. If the ratio approaches 1, energy is as if propagating in free space where the waveguide loses its guiding effects.

Figure 5:
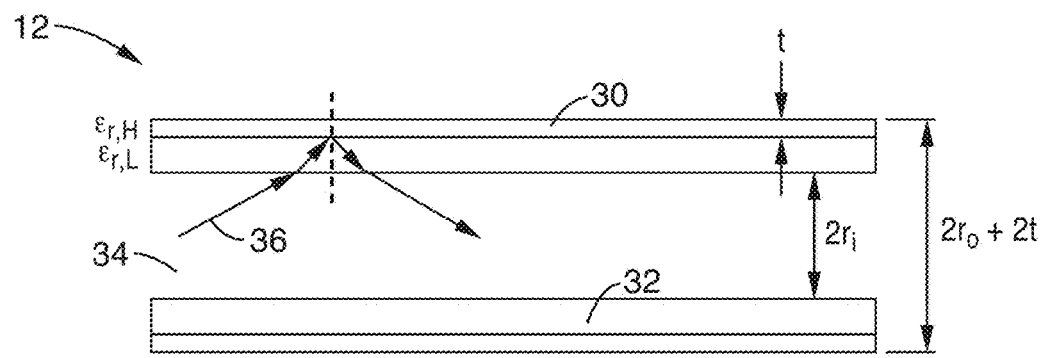
FIG. 5 shows a detailed schematic view of a hollow plastic waveguide in accordance with the present invention.

FIG. 5 shows a detailed schematic view of a beam path 36 hollow plastic waveguide 12 having an outer cladding layer 30 in accordance with the present invention. By coating (at thickness t) the waveguide wall 32 (having dielectric constant $\in_{r,L}$) using material 30 with a higher dielectric constant ($\in_{r,H}$), a maximum field confinement may be achieved (total diameter equal to $2r_o+2t$). Inner volume 34 (defined by $2R_i$) may comprise an air-core or noble gas. A total beam path 36 at the waveguide wall 32 and cladding layer 30 interface is indicated in FIG. 5.

Figure 6:
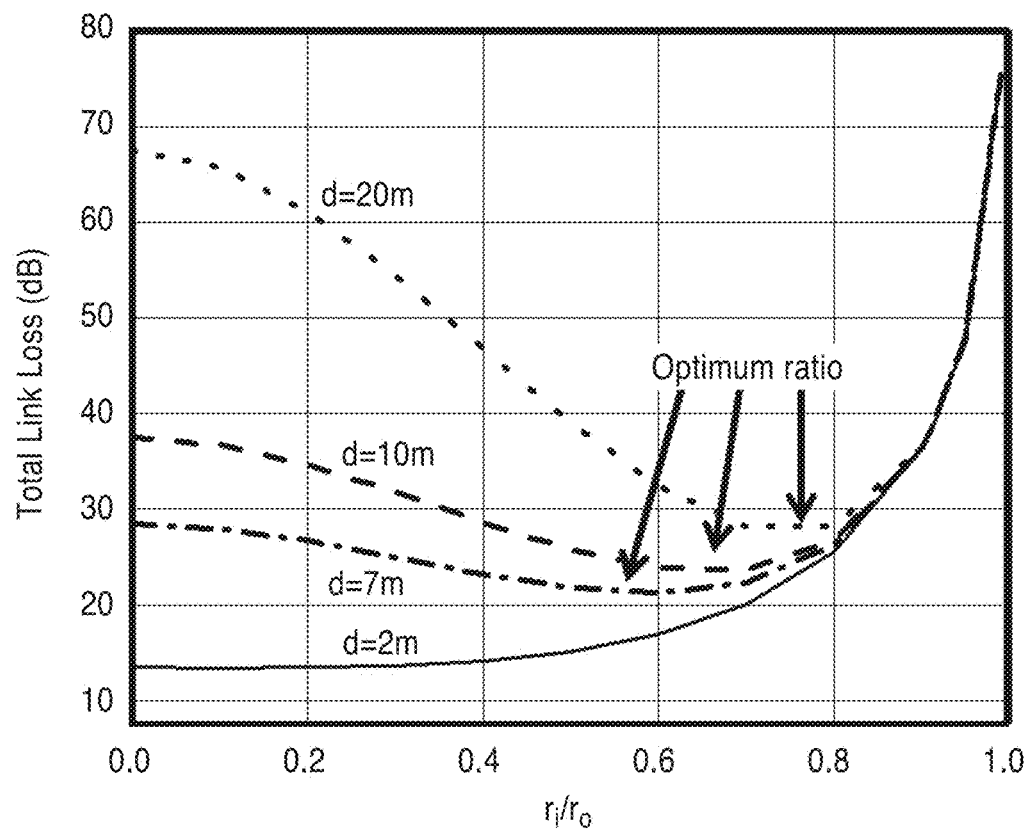
FIG. 6 shows a plot if total link loss estimated for different communication distance d.

FIG. 6 shows a plot of total link loss (in dB) estimated for a hollow waveguide given different communication distances d (e.g., d=2 m, d=7 m d=10 m, and d=20 m). The total link loss includes coupling losses and attenuation in the waveguide. As shown in FIG. 6, an optimum hollow ratio $r_i/r_o$ may be chosen (see arrows in FIG. 6) at the minimum total link loss for the target communication distance d. The figure indicates the advantages of hollow waveguide in the range of 10 to 20 meters, which is the sweet spot for data center inter-server link applications. As seen in FIG. 6, for mid-range waveguides ranging between 7 m and 10 m, a ratio $r_i/r_o$ ranging between 0.4 and 0.8, and preferably between 0.5 and 0.7 is selected.

Figure 7:
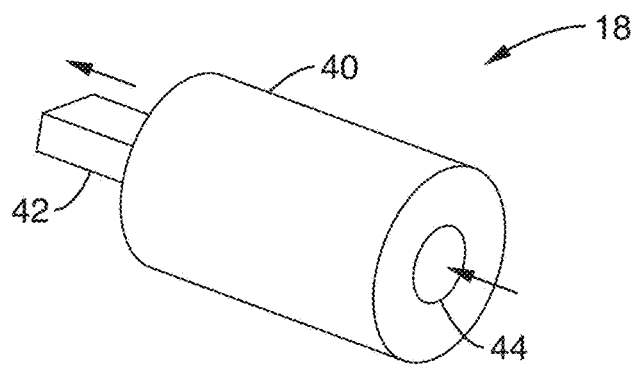
FIG. 7 is a schematic diagram of the coupler transition in accordance with the present invention.
Figure 8:
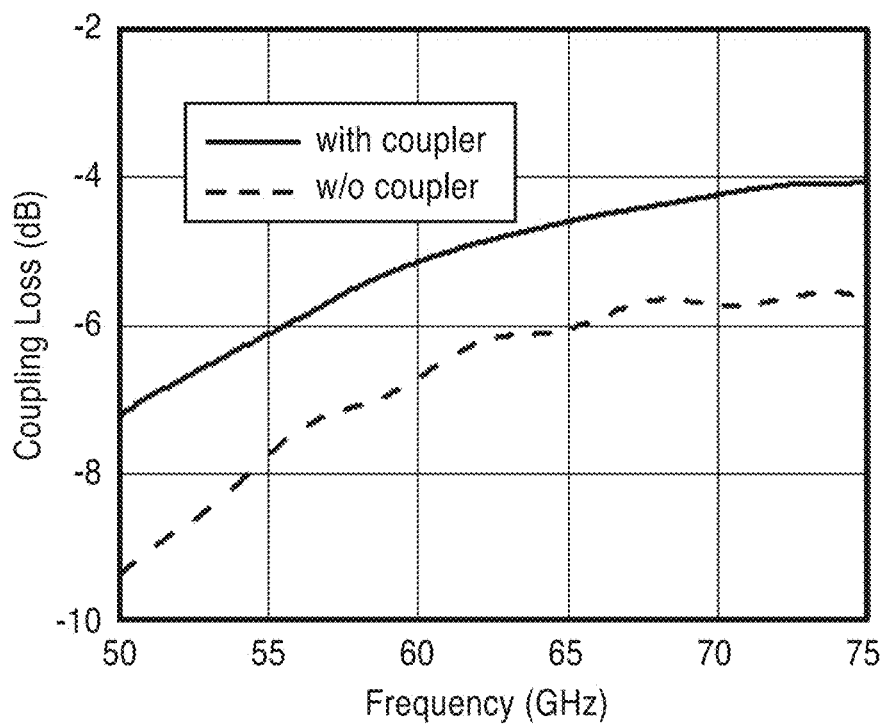
FIG. 8 is a plot of the coupling loss with and without the coupler transition of FIG. 7.

To maximize the coupling efficiency, a field transition polymer/plastic coupler 18 may be used having the configuration shown in the schematic diagram of FIG. 7. The rectangular tip 42 of the coupler 18 captures a linearly polarized electric field from the TX off-chip antenna 16 (see FIG. 1). A transition from the rectangular tip 42 to a section of solid circular rod 40 is followed to maximize the coupling efficiency. The energy is further coupled into the hollow plastic cable 12 that is inserted into aperture 44 of the coupler transition 18. Coupler transition 18 may use gradual changes in dimensions of the waveguide to further reduce reflections due to waveguide impedance mismatching. FIG. 8 is a plot of the coupling loss in dB vs. Frequency (GHz) with (solid line) and without (dashed line) coupler transition 18 of FIG. 7.

Tests were conducted to measure the data rate of a 7.6 m hollow Teflon wave cable for various distances. The cable was placed in a 'U' shape to keep the distance between testing equipment and oscilloscope short. This curved experimental setup also demonstrated the capabilities of the hollow wave cable of the present invention with transmission of data through bent-corners, which is important for the cable routing in data centers. Poly-foam may be used to wrap the plastic cable for guarding.

Figure 9:
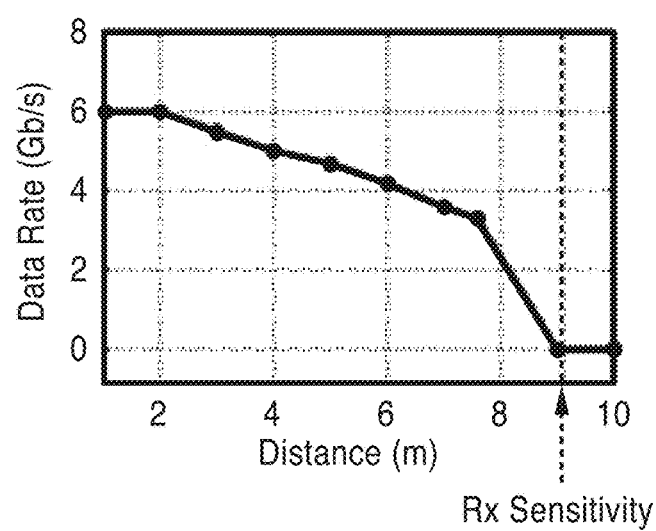
FIG. 9 is a plot of the measured data rate vs. incrementing distance.
Figure 10A:
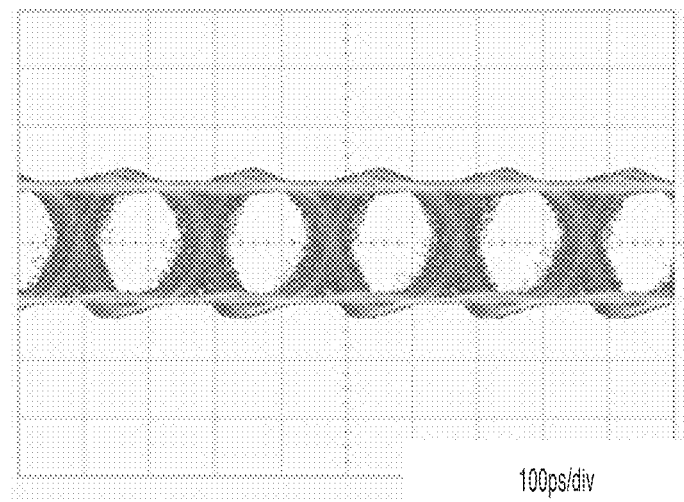
FIG. 10A and FIG. 10B show the measured eye-diagrams under $2^{15}-1$ pseudorandom binary sequence (PRBS) with a bit error rate (BER) $<10^{-12}$.
Figure 10B:
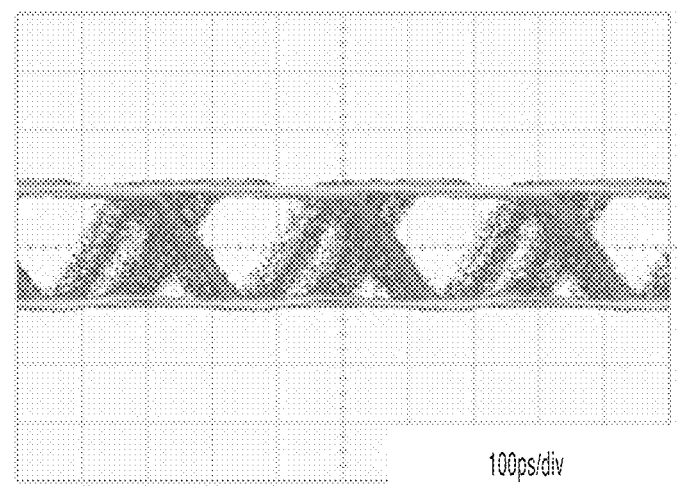

FIG. 9 shows a plot of the measured results for data rate (Gb/s) vs. distance (m). As seen in FIG. 9, the prototype wave cable system exhibited a data rate of 6 Gb/s at the distance of 2 m, and degrades to 3.3 Gb/s at the distance of 7.6 m. These results are also illustrated with the received eye-diagrams of PRBS data in FIG. 10A (2 m and 6 Gb/s) and FIG. 10B (7.6 m and 3.3 Gb/s) at 100 ps/div. Since the RX ceases detecting signal at the distance of 9 m, the measured Rx sensitivity is therefore estimated around −17 dBm see FIG. 9). The data rate degradation over the distance is mainly coming from frequency dispersion and to a lesser degree from polarization mode dispersion. However, it can be further improved by enhancing the antenna directivity and surrounding the Teflon shell with cladding structures.

This experiment also suggests that increasing communication distance can be achieved straightforwardly by increasing TX power without adding much system complexity.

From the discussion above, it will be appreciated that the invention can be embodied in various ways, including but not limited to the following:

1. A waveguide for guiding electromagnetic radiation, comprising: a hollow polymeric cable for guiding electromagnetic radiation; the cable comprising an inner channel defining an air-core or noble gas filled chamber; wherein the inner channel is surrounded by a dielectric polymeric layer.

2. A waveguide as in any of the previous embodiments, wherein the cable comprises a tubular elongate member having an outer radius and inner radius.

3. A waveguide as in any of the previous embodiments, wherein the cable comprises plastic.

4. A waveguide as in any of the previous embodiments, wherein the polymeric layer is coated with an outer material having a higher dielectric constant than the polymeric layer.

5. A waveguide as in any of the previous embodiments, wherein a ratio between the inner radius and outer radius is configured to minimize link loss of the electromagnetic radiation.

6. A waveguide as in any of the previous embodiments, wherein the cable is configured as a link for inter-server communications.

7. A waveguide as in any of the previous embodiments, wherein the cable is configured as mid-range link having a ratio $r_i/r_o$ ranging between 0.4 and 0.8.

8. A waveguide as in any of the previous embodiments, wherein the ratio $r_i/r_o$ ranges between 0.5 and 0.7.

9. A waveguide as in any of the previous embodiments: wherein the cable is a component in an inter-server communications interconnect; and wherein the cable comprises first and second ends, each of the first and second ends coupled to an RF transmitter, or an RF receiver, or an RF transceiver.

10. An interconnect device for inter-server communications, comprising: a hollow polymeric waveguide; the waveguide comprising an inner channel defining an air-core or noble gas filled chamber; the waveguide having first and second ends; and a pair of antennas coupled to each end of the waveguide to propagate an electromagnetic signal between the first and second ends.

11. A device as in any of the previous embodiments, wherein the waveguide comprises a tubular elongate member having an outer radius and inner radius.

12. A device as in any of the previous embodiments, wherein the waveguide comprises plastic.

13. A device as in any of the previous embodiments, wherein the waveguide comprises a dielectric polymeric layer that is coated with an outer layer comprising a material having a higher dielectric constant than the polymeric layer.

14. A device as in any of the previous embodiments, wherein a ratio between the inner radius and outer radius is configured to minimize link loss of the electromagnetic radiation.

15. A device as in any of the previous embodiments, further comprising a field transition coupling member disposed between each antenna and the first and second ends of the waveguide.

16. A device as in any of the previous embodiments, wherein the field transition coupling member is plastic.

17. A method for guiding electromagnetic radiation, comprising: coupling first and second ends of a hollow polymeric cable to first and second antennas; the cable comprising an inner channel defining an air-core or noble gas filled chamber; wherein the inner channel is surrounded by a dielectric polymeric layer; and guiding electromagnetic radiation from the first antenna to the second antenna through the inner channel of the cable.

18. A method as in any of the previous embodiments, wherein the cable comprises a tubular elongate member having an outer radius and inner radius.

19. A method as in any of the previous embodiments, wherein the cable comprises plastic.

20. A method as in any of the previous embodiments, wherein the polymeric layer is coated with an outer material having a higher dielectric constant than the polymeric layer.

21. A method as in any of the previous embodiments, wherein a ratio between the inner radius and outer radius is configured to minimize link loss of the electromagnetic radiation.

22. A method as in any of the previous embodiments, wherein the electromagnetic radiation is propagated through the cable under an amplitude key shifting modulation scheme.

23. A method as in any of the previous embodiments, wherein the electromagnetic radiation is propagated as a single mode.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method for guiding electromagnetic radiation, comprising:
    coupling first and second ends of a hollow polymeric cable to first and second antennas, respectively;
    the cable comprising an inner channel defining an air-core or noble gas filled chamber;
    wherein the inner channel is surrounded by a dielectric polymeric layer; and
    guiding electromagnetic radiation from the first antenna to the second antenna through the inner channel of the cable;
    wherein the electromagnetic radiation is propagated through the cable under an amplitude key shifting modulation scheme.

2. A waveguide for guiding electromagnetic radiation, comprising:
   a hollow polymeric cable for guiding electromagnetic radiation;
   the cable comprising an inner channel defining an air-core or noble gas filled chamber;
   wherein the inner channel is surrounded by a dielectric polymeric layer; and
   wherein the polymeric layer is coated with an outer material having a higher dielectric constant than the polymeric layer.

3. A waveguide as recited in claim 2, wherein the cable comprises plastic.

4. A waveguide as recited in claim 2, wherein the dielectric polymeric layer comprises a tubular elongate member having an outer radius $r_o$ and inner radius $r_i$.

5. A waveguide as recited in claim 4, wherein a ratio between the inner radius and outer radius is configured to minimize total link loss of the electromagnetic radiation;
   wherein the total link loss includes coupling losses and attenuation in the waveguide.

6. A waveguide as recited in claim 5, wherein the cable is configured as a link for inter-server communications.

7. A waveguide as recited in claim 6, wherein the cable is configured as a waveguide having a ratio $r_i/r_o$ ranging between 0.4 and 0.8.

8. A waveguide as recited in claim 7, wherein the ratio $r_i/r_o$ ranges between 0.5 and 0.7.

9. A waveguide as recited in claim 6:
   wherein the cable comprises first and second ends, each of the first and second ends coupled to an RF transmitter, or an RF receiver, or an RF transceiver.

10. An interconnect device for inter-server communications, comprising:
    a hollow polymeric waveguide;
    the waveguide comprising an inner channel defining an air-core or noble gas filled chamber;
    the waveguide having first and second ends;
    a pair of antennas, respectively coupled to each end of the waveguide to propagate an electromagnetic signal between the first and second ends; and
    a respective field transition coupling member disposed between each antenna and the corresponding first and second ends of the waveguide;
    wherein the respective field transition coupling member is plastic.

11. An interconnect device for inter-server communications, comprising:
    a hollow polymeric waveguide;
    the waveguide comprising an inner channel defining an air-core or noble gas filled chamber;
    the waveguide having first and second ends; and
    a pair of antennas, respectively coupled to each end of the waveguide to propagate an electromagnetic signal between the first and second ends;
    wherein the waveguide comprises a dielectric polymeric layer that is coated with an outer layer comprising a material having a higher dielectric constant than the dielectric polymeric layer.

12. A device as recited in claim 11, wherein the waveguide comprises plastic.

13. A device as recited in claim 11, wherein the dielectric polymeric layer comprises a tubular elongate member having an outer radius $r_o$ and inner radius $r_i$.

14. A device as recited in claim 13, wherein a ratio between the inner radius and outer radius is configured to minimize total link loss of the electromagnetic radiation;
    wherein the total link loss includes coupling losses and attenuation in the waveguide.

15. A device as recited in claim 11, further comprising a respective field transition coupling member disposed between each antenna and the corresponding first and second ends of the waveguide.

16. A device as recited in claim 15, wherein the respective field transition coupling member is plastic.

17. A method for guiding electromagnetic radiation, comprising:
    coupling first and second ends of a hollow polymeric cable to first and second antennas, respectively;
    the cable comprising an inner channel defining an air-core or noble gas filled chamber;
    wherein the inner channel is surrounded by a dielectric polymeric layer; and
    guiding electromagnetic radiation from the first antenna to the second antenna through the inner channel of the cable;
    wherein the polymeric layer is coated with an outer material having a higher dielectric constant than the polymeric layer.

18. A method as recited in claim 17, wherein the dielectric polymeric layer comprises a tubular elongate member having an outer radius $r_o$ and inner radius $r_i$.

19. A method as recited in claim 18, wherein a ratio between the inner radius and outer radius is configured to minimize total link loss of the electromagnetic radiation;
    wherein the total link loss includes coupling losses and attenuation in the waveguide.

20. A method as recited in claim 17, wherein the cable comprises plastic.

21. A method as recited in claim 17, wherein the electromagnetic radiation is propagated as a single mode.

22. A method as recited in claim 17, wherein the electromagnetic radiation is propagated through the cable under an amplitude key shifting modulation scheme.

* * * * *